United States Patent
Eckert et al.

(10) Patent No.: US 10,133,678 B2
(45) Date of Patent: Nov. 20, 2018

(54) METHOD AND APPARATUS FOR MEMORY MANAGEMENT

(71) Applicant: Advanced Micro Devices, Inc., Sunnyvale, CA (US)

(72) Inventors: Yasuko Eckert, Kirkland, WA (US); Syed Ali Jafri, Sunnyvale, CA (US); Srilatha Manne, Portland, OR (US); Gabriel Loh, Bellevue, WA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 309 days.

(21) Appl. No.: 14/012,475

(22) Filed: Aug. 28, 2013

(65) Prior Publication Data

US 2015/0067264 A1   Mar. 5, 2015

(51) Int. Cl.
*G06F 12/00*   (2006.01)
*G06F 12/126*   (2016.01)

(52) U.S. Cl.
CPC ............ *G06F 12/126* (2013.01); *Y02D 10/13* (2018.01)

(58) Field of Classification Search
CPC ......... G06F 12/0862; G06F 2212/6028; G06F 12/0897; G06F 2212/6026; G06F 9/383; G06F 2212/6022; G06F 12/0815; G06F 2212/621; G06F 12/121; G06F 12/122; G06F 12/0804; G06F 12/0891; G06F 2212/69; G06F 12/0871; G06F 12/12; G06F 3/0647; G06F 12/0868; G06F 12/127; G06F 3/0652; G06F 17/30132; G06F 2201/81; G06F 12/0811; G06F 12/0875; G06F 2212/601; G06F 2212/60; G06F 10/13; G06F 12/126
See application file for complete search history.

(56) References Cited

U.S. PATENT DOCUMENTS

| | | | | |
|---|---|---|---|---|
| 7,934,054 | B1 * | 4/2011 | Moll | G06F 1/3203 345/541 |
| 2003/0217230 | A1 * | 11/2003 | Rodriguez | G06F 12/127 711/136 |
| 2006/0179228 | A1 * | 8/2006 | Thompson | G06F 9/30032 711/129 |
| 2007/0067840 | A1 * | 3/2007 | Young | G06F 21/554 726/22 |
| 2009/0172287 | A1 * | 7/2009 | LeMire et al. | 711/128 |

(Continued)

OTHER PUBLICATIONS

Hsien-Hsin S. Lee et al., "Improving Bandwidth Utilization Using Eager Writeback", 22 pages, Journal of Instruction-Level Parallelism 3, 2001.

(Continued)

*Primary Examiner* — David X Yi
*Assistant Examiner* — Candice Rankin
(74) *Attorney, Agent, or Firm* — Park, Vaughan, Fleming & Dowler LLP

(57) ABSTRACT

In some embodiments, a method of managing cache memory includes identifying a group of cache lines in a cache memory, based on a correlation between the cache lines. The method also includes tracking evictions of cache lines in the group from the cache memory and, in response to a determination that a criterion regarding eviction of cache lines in the group from the cache memory is satisfied, selecting one or more (e.g., all) remaining cache lines in the group for eviction.

21 Claims, 8 Drawing Sheets

(56) References Cited

U.S. PATENT DOCUMENTS

| | | | |
|---|---|---|---|
| 2011/0072218 A1* | 3/2011 | Manne et al. | 711/136 |
| 2011/0219208 A1* | 9/2011 | Asaad et al. | 712/12 |
| 2012/0284462 A1* | 11/2012 | Licht et al. | 711/128 |
| 2013/0097309 A1* | 4/2013 | Ma | H04L 29/08099 709/224 |
| 2013/0166846 A1* | 6/2013 | Gaur et al. | 711/122 |
| 2015/0052309 A1* | 2/2015 | Philip et al. | 711/128 |

OTHER PUBLICATIONS

Carole-Jean Wu et al., "PACMan: Perfetch-Aware Cache Management for High Performance Caching", 12 pages, 44$^{th}$ Annual IEEE/ACM International Symposium on Microarchitecture, 2011.

\* cited by examiner

Group Definition Table 302

| Group ID | Cache Lines | Usefulness |
|---|---|---|
| Group ID | Cache Lines | Usefulness |

404 – Group ID
406 – Cache Lines
408 – Usefulness
402

Group Eviction Counters 304

| Group ID | Eviction Counter |
|---|---|
| Group ID | Eviction Counter |

424 – Group ID
426 – Eviction Counter
422

Threshold Table
306

| Group ID | Group Eviction Threshold | ←442 |
| Group ID | Group Eviction Threshold | ←442 |

Correlation Counters
320

| Group ID | Correlation Counter | ←462 |
| Group ID | Correlation Counter | ←462 |

METHOD AND APPARATUS FOR MEMORY MANAGEMENT

TECHNICAL FIELD

The present embodiments relate generally to cache memory, and more specifically to cache memory eviction policies.

BACKGROUND

Cache memories may implement eviction policies based on how recently or frequently various cache lines have been accessed. Some cache lines, however, may contain data that will not be referenced again by an access request before eviction. This data is said to be dead. Cache lines with dead data pollute the cache memory by occupying space that could otherwise be used for cache lines that are likely to be referenced by access requests.

SUMMARY OF ONE OR MORE EMBODIMENTS

Embodiments are disclosed in which bulk evictions from a cache memory of groups of correlated cache lines are performed.

In some embodiments, a method of managing cache memory includes identifying a group of cache lines in a cache memory, based on a correlation between the cache lines. The method also includes tracking evictions of cache lines in the group from the cache memory and determining whether a criterion regarding eviction of cache lines in the group from the cache memory is satisfied. In response to determining that the criterion is satisfied, one or more (e.g., all) remaining cache lines in the group are selected for eviction.

In some embodiments, an apparatus such as, for example, a processor including a cache memory or a separate cache memory system includes a cache data array to store cache lines and a cache controller that is coupled to the cache data array. The cache controller includes group identification logic to identify a group of cache lines in the cache data array, based on a correlation between the cache lines. The cache controller also includes eviction logic to determine whether a criterion regarding eviction of cache lines in the group from the cache data array is satisfied and, in response to a determination that the criterion is satisfied, to select one or more (e.g., all) remaining cache lines in the group for eviction from the cache data array.

Advantageously, in some circumstances, some embodiments may result in processors operating more efficiently from the perspective of performance, power consumption or both. Other advantages may also be obtained.

BRIEF DESCRIPTION OF THE DRAWINGS

The present embodiments are illustrated by way of example and are not intended to be limited by the figures of the accompanying drawings.

FIG. 4A shows a data structure for a group definition table in accordance with some embodiments.

FIG. 4B shows a data structure for group eviction counters in accordance with some embodiments.

FIG. 4C shows a data structure for a threshold table in accordance with some embodiments.

FIG. 4D shows a data structure for correlation counters in accordance with some embodiments.

Like reference numerals refer to corresponding parts throughout the figures and specification.

DETAILED DESCRIPTION

Reference will now be made in detail to various embodiments, examples of which are illustrated in the accompanying drawings. In the following detailed description, numerous specific details are set forth in order to provide a thorough understanding of the disclosure. However, some embodiments may be practiced without these specific details. In other instances, well-known methods, procedures, components, and circuits have not been described in detail so as not to unnecessarily obscure aspects of the embodiments.

Figure 1:
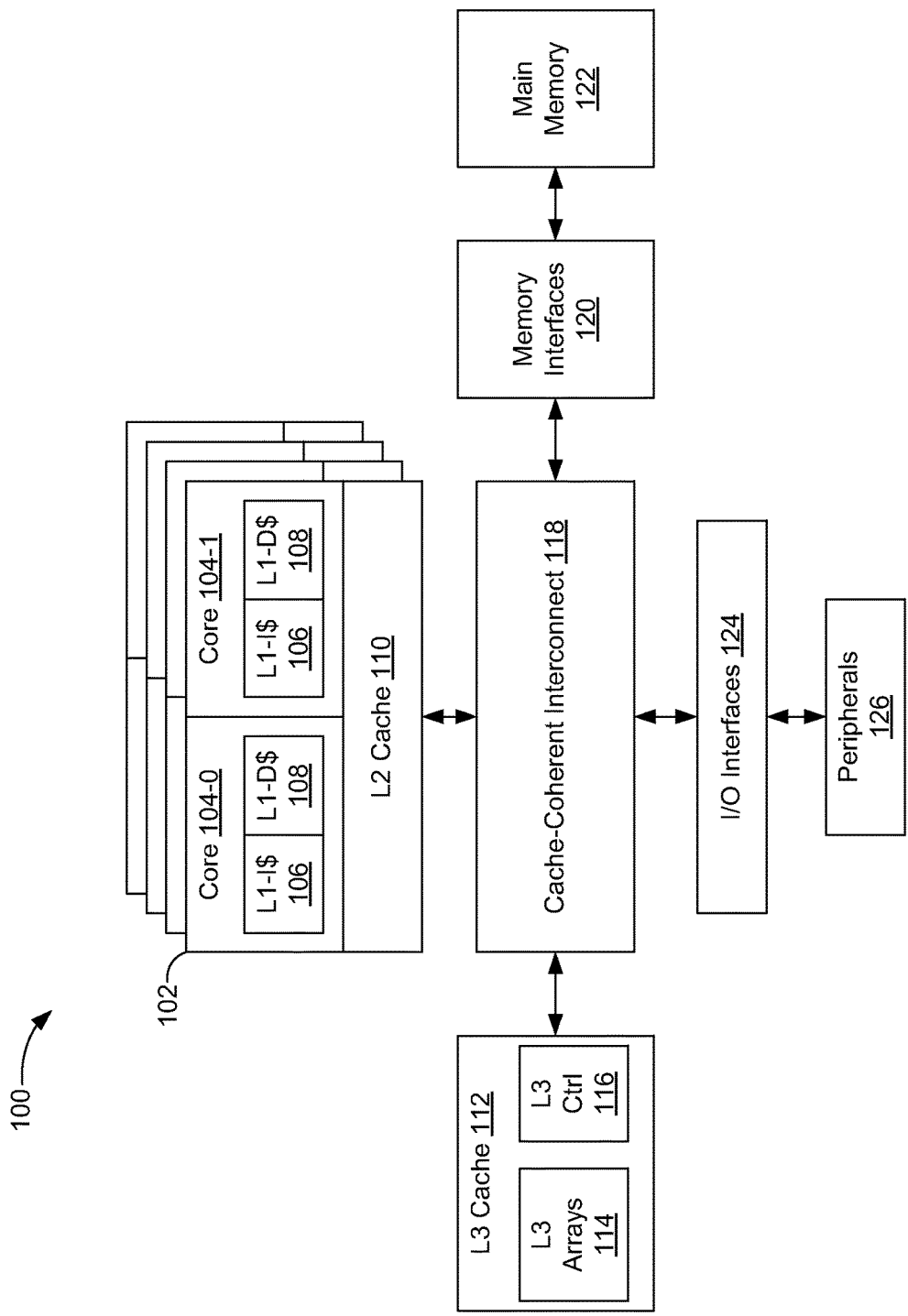
FIG. 1 is a block diagram showing a memory system in accordance with some embodiments.

FIG. 1 is a block diagram showing a system 100 in accordance with some embodiments. The system 100 includes a plurality of processing modules 102 (e.g., four processing modules 102), each of which includes a first processor core 104-0 and a second processor core 104-1. Each of the processor cores 104-0 and 104-1 includes a level 1 instruction cache memory (L1-I$) 106 to cache instructions to be executed by the corresponding processor core 104-0 or 104-1 and a level 1 data cache (L1-D$) memory 108 to store data to be referenced by the corresponding processor core 104-0 or 104-1 when executing instructions. A level 2 (L2) cache memory 110 is shared between the two processor cores 104-0 and 104-1 on each processing module 102.

A cache-coherent interconnect 118 couples the L2 cache memories 110 (or L2 caches 110, for short) on the processing modules 102 to a level 3 (L3) cache memory 112. The L3 cache 112 includes L3 memory arrays 114 to store information (e.g., data and instructions) cached in the L3 cache 112. Associated with the L3 cache 112 is an L3 cache controller (L3 Ctrl) 116. (The L1 caches 106 and 108 and L2 caches 110 also include memory arrays and have associated cache controllers, which are not shown in FIG. 1 for simplicity.)

In the example of FIG. 1, the L3 cache 112 is the lowest-level cache memory in the system 100 and is therefore referred to as the lowest-level cache or last-level cache (LLC). In other examples, a memory system may include an LLC below the L3 cache 112. In some embodiments, the L1 caches 106 and 108, L2 caches 110, and L3 cache 112 are implemented using static random-access memory (SRAM).

In addition to coupling the L2 caches 110 to the L3 cache 112, the cache-coherent interconnect 118 maintains cache coherency throughout the system 100. The cache-coherent interconnect 118 is also coupled to main memory 122 through memory interfaces 120. In some embodiments, the main memory 122 is implemented using dynamic random-access memory (DRAM). In some embodiments, the memory interfaces 120 coupling the cache-coherent interconnect 118 to the main memory 122 are double-data-rate (DDR) interfaces.

The cache-coherent interconnect 118 is also connected to input/output (I/O) interfaces 124, which allow the cache-coherent interconnect 118, and through it the processing modules 102 and main memory 122, to be coupled to peripheral devices 126.

The L1 caches 106 and 108, L2 caches 110, L3 cache 112, and main memory 122 form a memory hierarchy in the system 100. Each level of this hierarchy has less storage capacity but faster access time than the level below it: the L1 caches 106 and 108 offer less storage but faster access than the L2 caches 110, which offer less storage but faster access than the L3 cache 112, which offers less storage but faster access than the main memory 122.

The system 100 is merely an example of a multi-level memory system configuration; other configurations are possible. For example, the number of processor cores per processing module 102 may vary. More than two processor cores may share an L2 cache 110, or each processor core 104-0 and 104-1 may have its own L2 cache 110. Other examples are possible.

Figure 2:
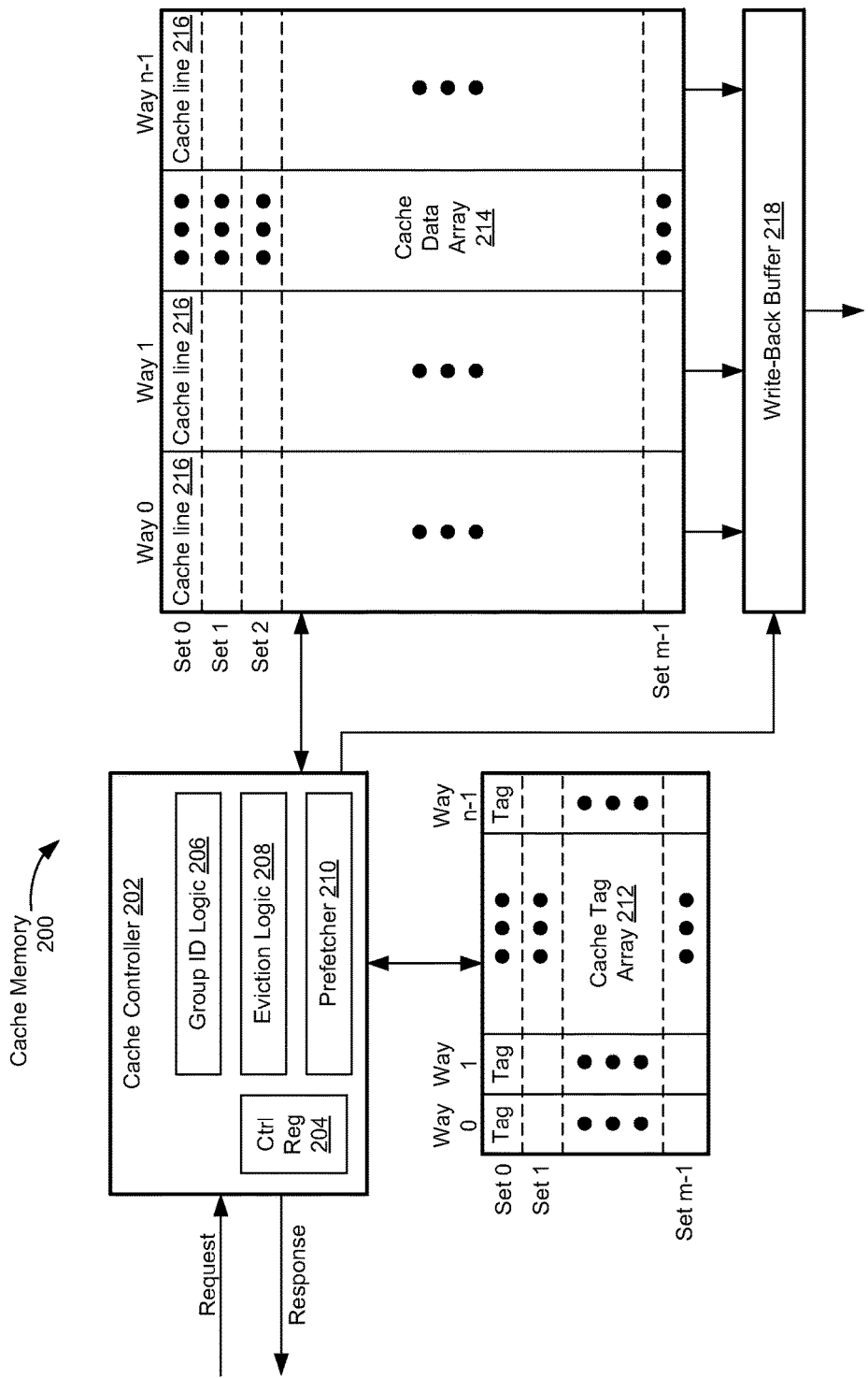
FIG. 2 is a block diagram of a cache memory in accordance with some embodiments.

FIG. 2 is a block diagram of a cache memory 200 in accordance with some embodiments. The cache memory 200 is a particular level of cache memory (e.g., an L1 cache 106 or 108, an L2 cache 110, or the L3 cache 112, FIG. 1) in the system 100 (FIG. 1). The cache memory 200 includes a cache data array 214 and a cache tag array 212. (The term data as used in the context of the cache data array 214 may include instructions as well as data to be referenced when executing instructions.) A cache controller 202 is coupled to the cache data array 214 and cache tag array 212 to control operation of the cache data array 214 and cache tag array 212.

Addresses for information cached in respective cache lines 216 in the cache data array 214 are divided into multiple portions, including an index and a tag. Cache lines 216 are installed in the cache data array 214 at locations indexed by the index portions of the addresses, and tags are stored in the cache tag array 212 at locations indexed by the index portions of the addresses. (A cache line 216 may correspond to a plurality of addresses that share common index and tag portions.) These addresses are typically physical addresses, but in some embodiments may be virtual addresses. To perform a memory access operation in the cache memory 200, a memory access request is provided to the cache controller 202 (e.g., from a processor core 104-0 or 104-1, FIG. 1). The memory access request specifies an address. If a tag stored at a location in the cache tag array 212 indexed by the index portion of the specified address matches the tag portion of the specified address, then a cache hit occurs. Otherwise, a cache miss occurs. For a read request that results in a cache hit, the cache line 216 at a corresponding location in the cache data array 214 is returned in response to the request. For a write request that results in a cache hit, the cache line 216 at the corresponding location in the cache data array 214 is modified.

In the example of FIG. 2, the cache data array 214 is set-associative: for each index, it includes a set of n locations at which a particular cache line 216 may be installed, where n is an integer greater than one. The cache data array 214 is thus divided into n ways, numbered 0 to n−1; each location in a given set is situated in a distinct way. The cache data array 214 includes m sets, numbered 0 to m−1, where m is an integer greater than one. The sets are indexed by the index portions of addresses. The cache tag array 212 is similarly divided into sets and ways.

While FIG. 2 shows a set-associative cache data array 214, the cache data array 214 may instead be direct-mapped. A direct-mapped cache effectively only has a single way.

A new cache line 216 to be installed in the cache data array 214 thus may be installed in any way of the set specified by the index portion of the addresses corresponding to the cache line 216. If all of the ways in the specified set already have valid cache lines 216, then a cache line 216 may be evicted from one of the ways and the new cache line 216 installed in its place. If write-back is to be performed (e.g., because the evicted cache line 216 is modified or because the cache memory 200 is non-inclusive with respect to a lower-level cache memory), the evicted cache line is placed in a write-back buffer 218, from where it is written back to a lower-level cache memory in the system 100 (FIG. 1).

The cache controller 202 includes group identification logic 206 that identifies groups of cache lines 216 based on correlations between respective cache lines 216. The group identification logic 206 thus clusters cache lines 216 into groups based on the correlations. In some embodiments, the group identification logic 206 clusters cache lines 216 into groups based on temporal correlations between the cache lines 216. For example, cache lines 216 that are installed in the cache data array 214 during specified time intervals are clustered into respective groups. In some other embodiments, the group identification logic 206 clusters cache lines 216 into groups based on spatial correlations between the cache lines 216 in the main memory 122 (FIG. 1). For example, cache lines 216 from respective pages in the main memory 122 are clustered into respective groups. In still other embodiments, the group identification logic 206 clusters cache lines 216 into groups based on prefetch events, as described further below.

The cache controller 202 also includes eviction logic 208. The eviction logic 208 may track evictions from the cache memory 200 (i.e., from the cache data array 214) of cache lines 216 in respective groups. Based on this tracking, the eviction logic 208 may determine that none of the cache lines 216 in a respective group is likely to be referenced again by an access request before eviction. In making such a determination, the eviction logic 208 thus predicts that the data in the cache lines 216 of the respective group are dead data that will not be referenced again before eviction. In response to this determination, the eviction logic 208 selects all remaining cache lines 216 (or alternatively, a portion of the remaining cache lines 216) in the respective group for eviction. Dead cache lines 216 (i.e., cache lines 216 with dead data) occupy space in the cache data array 214 that could be used to store other cache lines 216 that are more likely to be referenced, and thereby pollute the cache data array 214. By coordinating the eviction of groups of dead of cache lines 216, the eviction logic 208 mitigates this cache pollution and provides for more efficient cache memory management. Additional details regarding examples of the eviction logic 208 are provided below with respect to FIGS. 3A and 3B.

In some embodiments, the cache controller 202 includes a prefetcher 210 to speculatively fetch cache lines 216 from a lower level of memory and install them in the cache data array 214. The prefetcher 210 monitors requests received by the cache controller 202, identifies patterns in the requests, and performs speculative fetching based on the patterns. For example, the prefetcher 210 may be a stream-based prefetcher that identifies streams of memory access requests. Upon identifying a stream, the prefetcher attempts to load all cache lines 216 for the stream into the cache memory 200.

The cache lines 216 for a given stream may have addresses that have a constant spacing referred to as a stride, such that the prefetcher 210 is a stride prefetcher. The group identification logic 206 may cluster the cache lines 216 for the stream (e.g., cache lines 216 having a constant stride) into a group.

In some embodiments, the prefetcher 210 includes a prefetch table. Each entry in the prefetch table lists a set of requests for cache lines 216 to be loaded into the cache memory 200. The group identification logic 206 may cluster the cache lines 216 associated with a particular entry in the prefetch table into a group.

In some embodiments, the cache controller 202 includes a control register 204 to selectively enable or disable group-based eviction by the eviction logic 208. The control register 204 may also selectively enable or disable operation of the group identification logic 206 (FIG. 2). For example, group identification and/or group-based eviction may be enabled when the control register 204 stores a first value and disabled when the control register 204 stores a second value. In some embodiments, group identification and/or group-based eviction are selectively enabled or disabled depending on whether a level of capacity pressure for the cache memory 200 satisfies a criterion (e.g., a predefined criterion).

Figure 3A:
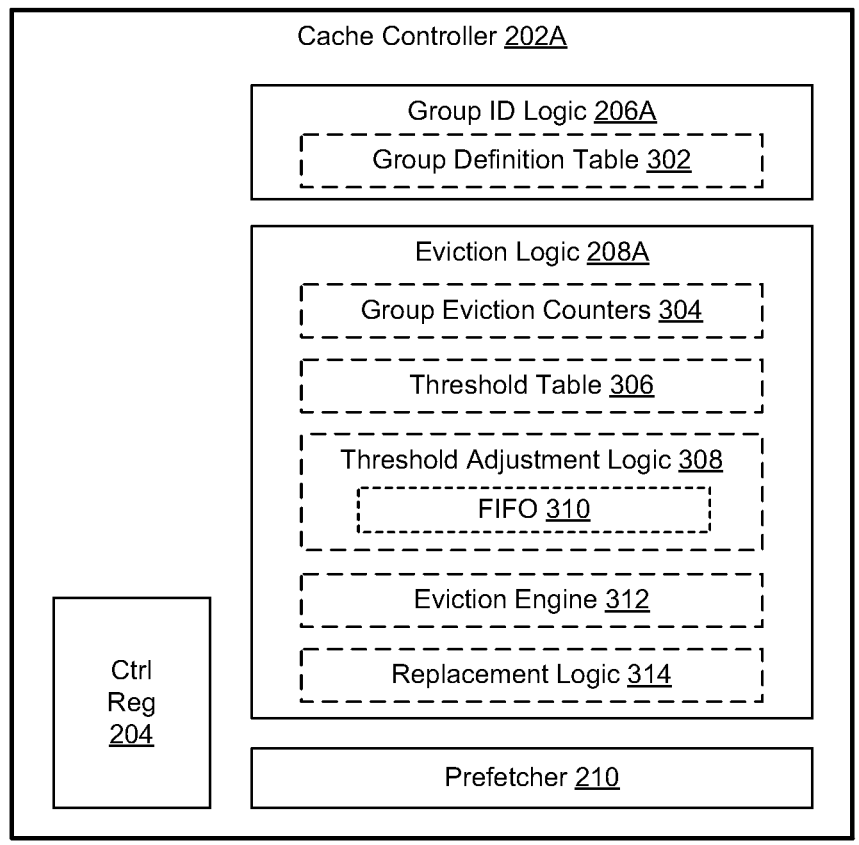
FIGS. 3A, 3B, and 3C are block diagrams of cache controllers in accordance with some embodiments.
Figure 3B:
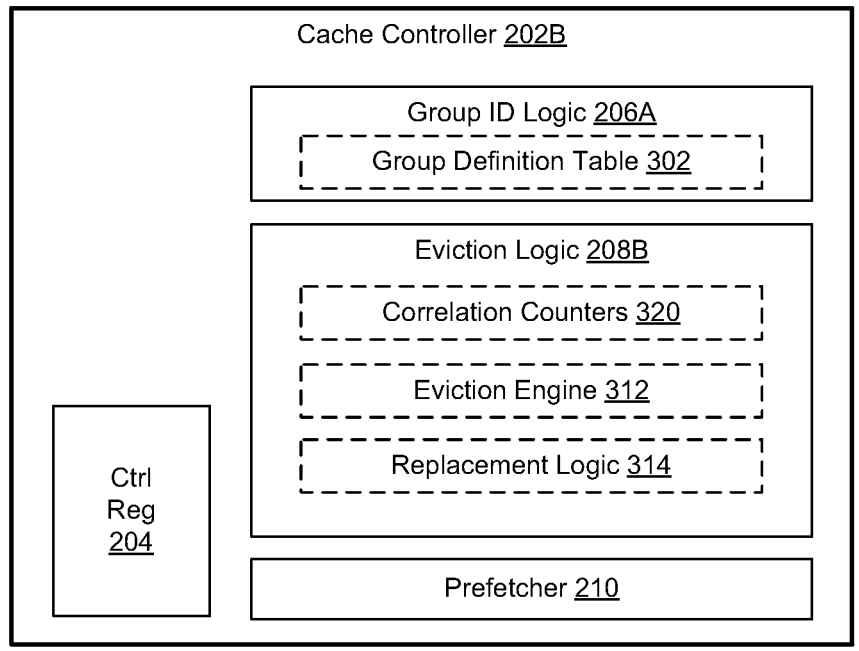
Figure 3C:
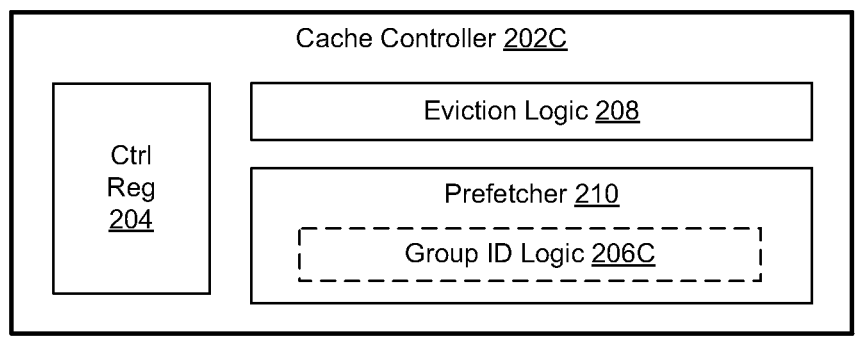

FIGS. 3A, 3B, and 3C are block diagrams of cache controllers 202A, 202B, and 202C, respectively, in accordance with some embodiments. The cache controllers 202A, 202B, and 202C are examples of the cache controller 202 (FIG. 2).

The cache controllers 202A and 202B (FIGS. 3A-3B) include group identification logic 206A, which includes a group definition table 302 for defining groups identified by the group identification logic 206A. FIG. 4A shows a data structure for the group definition table 302 in accordance with some embodiments. Each entry 402 corresponds to a particular group and includes a field 404 to store a group identifier and a field 406 to store indices in the cache data array 214 (FIG. 2) of cache lines 216 in the group. (Alternatively, the field 406 may store addresses of the cache lines 216 in the group.) In some embodiments, each entry 402 also includes a field 408 to store a usefulness bit for the group.

In some embodiments, the group definition table 302 is implemented in a circular buffer, such that each entry 402 in the circular buffer stores indices (or addresses) for all of the cache lines 216 in a particular group. When the circular buffer becomes full, the oldest group may be overwritten with a new group. Alternatively, the oldest group for which the usefulness bit is not set (e.g., equals '0') is overwritten, such that groups for which the usefulness bit is set (e.g., equals '1') are not overwritten with newer groups. When a group is overwritten, the cache controller 202 may simply stop tracking the group. The eviction logic 208 (FIG. 2) will then be unable to select remaining cache lines 216 in the group for eviction in the event that a criterion is satisfied. Alternatively, all remaining cache lines 216 in an overwritten group may be selected for eviction. In some embodiments, all remaining cache lines 216 in an overwritten group are selected for eviction if the usefulness bit for the group is not set, but not if the usefulness bit for the group is set.

In some embodiments, as previously described, each group may correspond to a respective page in memory. To identify such groups, the group definition table 302 may be implemented using a content-addressable memory that stores a portion of the address bits in the tag. Each entry in the content-addressable memory corresponds to a distinct cache line 216. Entries with matching stored portions of the tag are assumed to correspond to cache lines 216 in the same page. To identify all of the cache lines 216 for a particular page, the tag portion for the page is provided to the content-addressable memory as a search key. All entries in the content-addressable memory that match the search key are considered to point to cache lines 216 in the same page.

In some embodiments, instead of (or in addition to) using a group definition table 302, group identifiers are stored in the cache lines 216 themselves, or in the tags associated with the cache lines 216. A predefined number of bits may be set aside in the cache lines 216 or the tags to store group identifiers.

The cache controller 202A (FIG. 3A) also includes eviction logic 208A, which includes group eviction counters 304 and a threshold table 306. The group eviction counters 304 track the number of cache lines 216 from respective groups that are evicted (or selected for eviction) during a specified time interval. FIG. 4B shows a data structure for the group eviction counters 304 in accordance with some embodiments. Each entry 422 corresponds to a particular group and includes a field 424 that stores a group identifier and a field 426 that acts as a counter to track the number of cache lines 216 in the group that have been evicted (or selected for eviction) during a specified time interval. The counters in the fields 426 are reset (e.g., to zero) at the end of the specified time interval (and thus at the beginning of a new specified time interval).

The eviction count in a respective field 426 is compared to a threshold stored in the threshold table 306. Based on this comparison, a determination is made as to whether to select remaining cache lines 216 in a respective group for eviction. For example, if the eviction count equals the threshold (or alternatively exceeds the threshold), all or a portion of the remaining cache lines 216 in the respective group are selected for eviction. FIG. 4C shows a data structure for the threshold table 306 in accordance with some embodiments. Each entry 442 corresponds to a particular group and includes a field 444 that stores a group identifier and a field 446 that stores a threshold (the "group eviction threshold") for the group. The threshold table 306 therefore allows each group to have a distinct threshold for triggering group-based eviction. Alternatively, the threshold table 306 may be replaced with a register that stores a single threshold to be used for all of the groups.

In some embodiments, the eviction logic 208A also includes threshold adjustment logic 308 for dynamically adjusting the thresholds for different groups. The threshold adjustment logic 308 includes a first-in-first-out (FIFO) buffer 310 that queues the addresses (or indices) of cache lines 216 that are evicted (or selected for eviction) from the cache data array 214 (FIG. 2). When an address (or index) for a cache line 216 in a particular group is placed in the FIFO buffer 310, a corresponding eviction counter in a field 426 of the group eviction counters 304 is incremented. If the cache memory 200 receives an access request (e.g., a read or write request, or a prefetch request) for a cache line 216 in a particular group, then the counter value for the particular group, as stored in a corresponding field 426 of the group eviction counters 304, is assumed to be too low for use as a group eviction threshold. Accordingly, the group eviction threshold for the particular group, as stored in a corresponding field 446 of the threshold table 306, may be incremented (e.g., is set to be greater than the counter value, assuming it was not already greater than the counter value). If the threshold adjustment logic 308 determines that all addresses (or indices) for cache lines 216 in a particular group have been de-queued from the FIFO buffer 310, the counter value for the particular group, as stored in a corresponding field 426 of the group eviction counters 304, is assumed to be too high for use as a group eviction threshold. Accordingly, the group eviction threshold for the particular group, as stored in a corresponding field 446 of the threshold table 306, may be decremented (e.g., is set to be less than the counter value, assuming it was not already greater than the counter value). In some embodiments, the threshold adjustment logic 308 increments and decrements the group eviction threshold by fractional values, to provide hysteresis that dampens oscillation of the threshold. The threshold adjustment logic 308 thus allows predictions as to whether groups contain dead data to be based on access patterns for the groups.

The eviction logic 208A further includes an eviction engine 312 and/or replacement logic 314. The eviction engine 312 may walk the cache data array 214 and evict cache lines 216 that have been selected for evictions. In some embodiments, the eviction engine 312 includes a scrubber that performs evictions in the background, in a manner that avoids contention with pending access requests.

The replacement logic 314 may implement a least-recently-used (LRU) replacement policy, in which the LRU cache line 216 in a set is evicted to make room for a new cache line 216 in the set. When a cache line 216 is selected for eviction, as a member of a group for which remaining cache lines 216 have been selected for eviction, the cache line 216 may be specified as the LRU cache line 216 in its set. The cache line 216 will subsequently be evicted the next time there is an eviction from the set. In some embodiments, modified cache lines 216 that have been selected for eviction are specified as the LRU cache lines in their respective sets, while unmodified cache lines that have been selected for eviction are simply invalidated.

The cache controller 202B (FIG. 3B) includes eviction logic 208B, in which the group eviction counters 304 and threshold table 306 (FIG. 3A) are replaced with correlation counters 320 in accordance with some embodiments. The correlation counters 320 store eviction correlation values that are used to determine whether to select remaining cache lines 216 in respective groups for eviction. FIG. 4D shows a data structure for the correlation counters 320 in accordance with some embodiments. Each entry 462 corresponds to a group and includes a field 464 that stores a group identifier and a field 466 that acts as a counter that stores an eviction correlation value for the group. The eviction correlation value is incremented in response to a determination that a rate of cache line eviction from the group is greater than, or greater than or equal to, an upper threshold. For example, the eviction correlation value is incremented if a number of cache lines 216 in the group that are evicted from the cache data array 214 within a specified time interval is greater than, or greater than or equal to, the upper threshold. The eviction correlation value is decremented in response to a determination that a rate of cache line eviction from the group is less than, or less than or equal to, a lower threshold. For example, the eviction correlation value is decremented if a number of cache lines 216 in the group that are evicted from the cache data array 214 within a specified time interval group is less than, or less than or equal to, the lower threshold. The group eviction counters 304 are saturating counters that do not increment above a specified value and do not decrement below zero. Each group eviction counter 304 includes a specified number of bits (e.g., one bit or two bits).

If the correlation counter 320 for a group satisfies (e.g., is greater than, or greater than or equal to) a threshold, remaining cache lines 216 in the group are selected for eviction. In some embodiments, a determination is made as to whether a specified bit (e.g., the most significant bit) of the correlation counter 320 for the group is set (e.g., equals '1'). If the specified bit is set, remaining cache lines 216 in the group are selected for eviction.

The eviction logic 208B also includes the eviction engine 312 and/or replacement logic 314, as described for the eviction logic 208A (FIG. 3A).

In the cache controller 202C (FIG. 3C), group identification logic 206C is included in the prefetcher 210. The group identification logic 206C is an example of the group identification logic 206 (FIG. 2). The group identification logic 206C identifies cache lines 216 that are associated with a common prefetch event (e.g., are part of the same prefetch stream or are associated with a common index and thus a common entry in a prefetch table) as being in the same group. In some embodiments, the group identification logic 206C marks the cache lines 216 (or associated tags) with the group identifier. This marking may be performed using specified bits in the cache lines 216 or associated tags. The number of specified bits determines the maximum number of groups. Alternatively, or in addition, the group identification logic 206C maintains a group definition table 302 (FIGS. 3A-3B).

The cache controller 202C also includes eviction logic 208 (e.g., eviction logic 208A, FIG. 3A, or 208B, FIG. 3B) and the control register 204.

Figure 5:
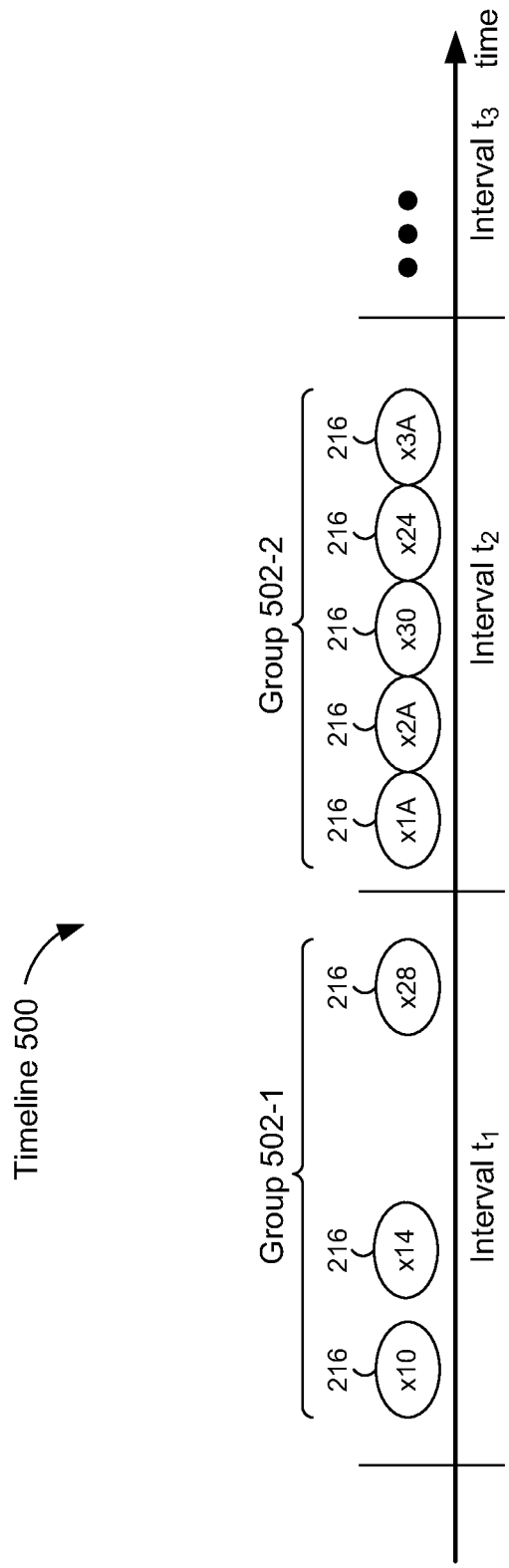
FIG. 5 is a timeline showing identification of groups of cache lines based on temporal correlation in accordance with some embodiments.

FIG. 5 is a timeline 500 showing identification of groups of cache lines 216 based on temporal correlation in accordance with some embodiments. The timeline 500 is divided into time intervals $t_1$, $t_2$, $t_3$, and so on. The duration of these time intervals, which may be constant, is chosen depending at least in part on the size of the cache data array 214. For example, the interval duration is chosen to be substantially less (e.g., orders of magnitude less) than the time it would take to write every cache line 216 in the cache data array 214. Also, these time intervals may be distinct from the time intervals associated with the group eviction counters 304 (FIG. 3A) and/or the threshold adjustment logic 308 (FIG. 3A). Cache lines 216 with indices x10, x14, and x28 are installed in the cache data array 214 in the first time interval $t_1$. The group identification logic 206 (FIG. 2) clusters these three cache lines 216 into a first group 502-1. Cache lines 216 with indices x1A, x2A, x30, x24, and x3A are installed in the cache data array 214 in the second time interval $t_2$. The group identification logic 206 clusters these five cache lines 216 into a second group 502-2. Additional groups are identified in a similar manner for subsequent time intervals. Each of the groups 502-1 and 502-2 is thus associated with a distinct time interval.

Figure 6:
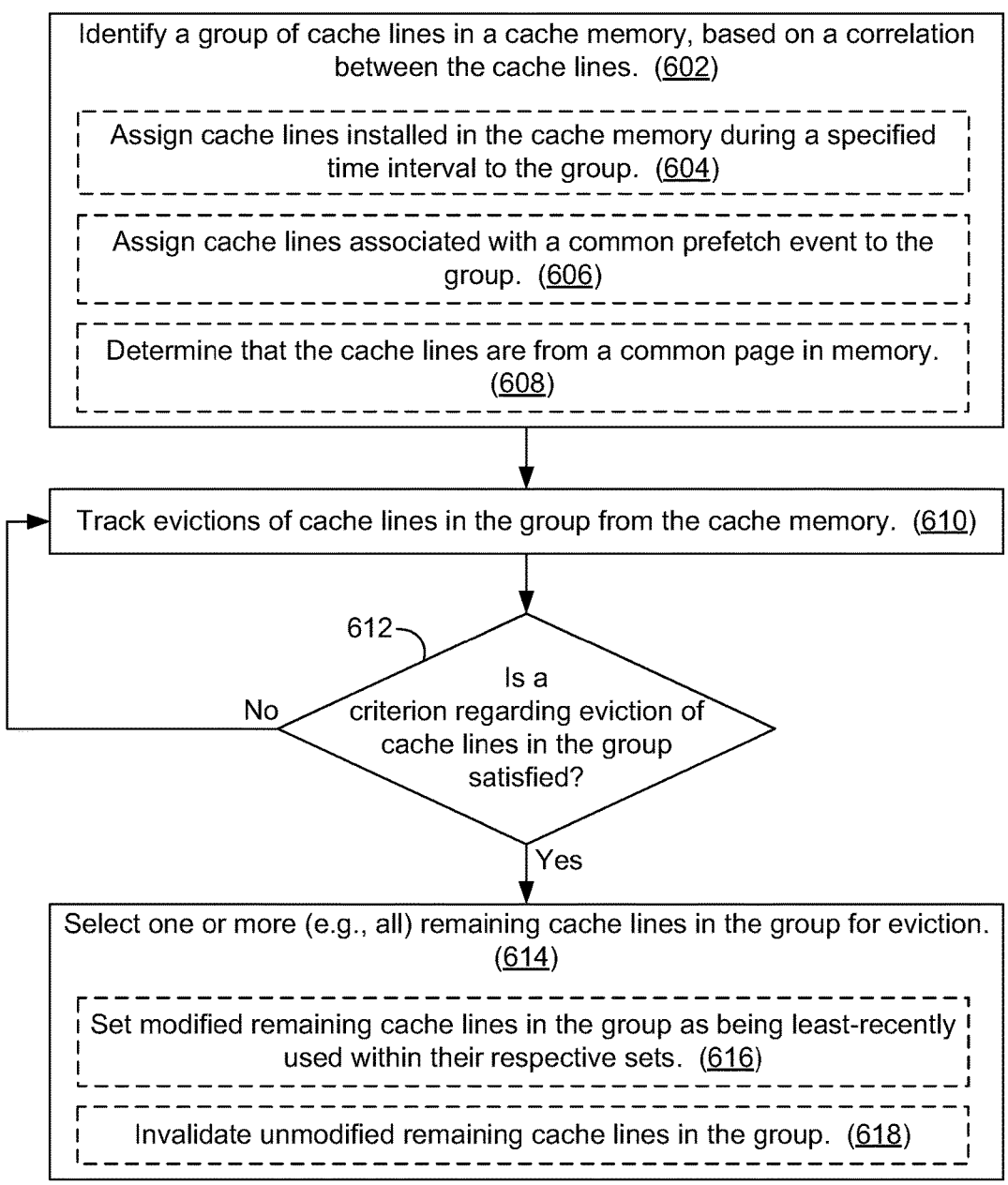
FIG. 6 is a flowchart showing a method of managing cache memory in accordance with some embodiments.

FIG. 6 is a flowchart showing a method 600 of managing cache memory in accordance with some embodiments. The method 600 is performed, for example, by the cache controller 202 in the cache memory 200 (FIG. 2). In some embodiments, the method 600 is performed in a level-one data cache 108 (FIG. 1). Alternatively, the method 600 is performed in another part of the system 100 (FIG. 1).

In the method 600, a group of cache lines 216 in the cache memory (e.g., in the cache data array 214, FIG. 2) is identified (602), based on a correlation between the cache lines. Identification of the group may be performed by group identification logic 206 (FIG. 2). The cache lines 216 in the group may be specified in the group definition table 302 (FIGS. 3A and 4A). The cache lines 216, or the tags, may be marked with a group identifier. In some embodiments, identifying the group of cache lines 216 includes assigning (604) cache lines 216 installed in the cache memory 200 during a specified time interval (e.g., time interval $t_1$ or $t_2$, FIG. 5) to the group. In some embodiments, identifying the group of cache lines 216 includes assigning (606) cache lines 216 associated with a common prefetch event (e.g., a common prefix stream or common entry in a prefix table) to the group (e.g., as described with respect to FIG. 3C). In some embodiments, identifying the group of cache lines 216 includes determining (608) that the cache lines 216 are from a common page in memory (e.g., as described with respect to the group identification logic 206A, FIGS. 3A-3B) or otherwise have spatial locality in memory (e.g., are all from a predefined range of addresses in main memory 122, FIG. 1).

Evictions of cache lines in the group from the cache memory are tracked (610). For example, the evictions are tracked in the group eviction counters 304 (FIGS. 3A and 4B), which are reset periodically. In another example, a rate of eviction for the group is tracked and used to update a correlation counter 320 (FIGS. 3B and 4D).

A determination is made (612) as to whether a criterion (e.g., a predefined criterion) regarding eviction of cache lines in the group is satisfied. In some embodiments, making this determination includes determining whether a number of cache lines 216 in the group that are evicted from the cache memory 200 during a specified time interval satisfies (e.g., is greater than, or greater than or equal to) a threshold. The threshold may be specified in the threshold table 306 (FIGS. 3A and 4C). In some embodiments, making this determination includes determining whether an eviction correlation value (e.g., as provided by a correlation counter 320, FIGS. 3B and 4D) for the group satisfies (e.g., is greater than, or greater than or equal to) a threshold.

If the criterion is not satisfied (612—No), tracking (612) of evictions continues.

If, however, the criterion is satisfied (612—Yes), one or more (e.g., all) remaining cache lines 216 in the group are selected (614) for eviction. (While all remaining cache lines 216 in the group are selected for eviction in accordance with some embodiments, in other embodiments only a portion of the remaining cache lines 216 in the group are selected for eviction, to reduce bandwidth associated with eviction and write-back.) In some embodiments, modified remaining cache lines 216 in the group are set (616) as LRU within their respective sets, such that they will be evicted during subsequent evictions for their respective sets. In some embodiments, the modified remaining cache lines 216 in the group are bulk evicted. In some embodiments, unmodified (i.e., clean) remaining cache lines 216 in the group are invalidated (618). In some embodiments, a bulk eviction is performed of all remaining cache lines 216 in the group, including both modified and clean cache lines 216 in the group. In some embodiments, an eviction engine 312 (FIGS. 3A-3B) walks the cache data array 214 (FIG. 2) and evicts cache lines 216 that have been selected for eviction. In some embodiments, a scrubber performs this eviction.

The method 600 provides efficient cache memory management by arranging for the eviction of cache lines 216 that are likely dead.

The method 600 can include more or fewer operations than shown in FIG. 6. An order of two or more operations may be changed, performance of two or more operations may overlap, and two or more operations may be combined into a single operation.

The foregoing description, for purpose of explanation, has been described with reference to specific embodiments. However, the illustrative discussions above are not intended to be exhaustive or to limit all embodiments to the precise forms disclosed. Many modifications and variations are possible in view of the above teachings. The disclosed embodiments were chosen and described to best explain the underlying principles and their practical applications, to thereby enable others skilled in the art to best implement various embodiments with various modifications as are suited to the particular use contemplated.

What is claimed is:

1. A method of managing cache memory, comprising:
    assigning cache lines in a cache memory to a group based on a correlation between the cache lines, the correlation based on a likelihood of accesses of the cache lines;
    tracking evictions of cache lines in the group from the cache memory; and
    selecting one or more remaining cache lines in the group for eviction from the cache memory based at least in part on evictions of cache lines in the group from the cache memory.

2. The method of claim 1, further comprising determining whether a criterion regarding eviction of cache lines in the group from the cache memory is satisfied.

3. The method of claim 1, wherein selecting one or more remaining cache lines in the group for eviction comprises selecting all remaining cache lines in the group for eviction.

4. The method of claim 1, wherein the correlation occurs for cache lines installed in the cache memory during a specified time interval.

5. The method of claim 1, wherein the correlation occurs for cache lines associated with a common prefetch event.

6. The method of claim 5, wherein cache lines associated with the common prefetch event are associated with a common prefetch stream.

7. The method of claim 5, wherein cache lines associated with the common prefetch event are associated with a common prefetch table entry.

8. The method of claim 1, wherein the correlation occurs for cache lines having a specified spatial locality between the cache lines in memory.

9. The method of claim 8, wherein the specified spatial locality occurs for cache lines from a common page in memory.

10. The method of claim 1, wherein selecting the one or more remaining cache lines for eviction comprises:
    determining that a threshold number of cache lines in the group was evicted from the cache memory during a specified time interval.

11. The method of claim 10, further comprising:
    incrementing a counter in response to eviction of cache lines in the group from the cache memory; and
    in response to a request directed to a cache line in the group, setting the threshold to be greater than a value of the counter.

12. The method of claim 11, further comprising:
    buffering, in a first-in-first-out (FIFO) buffer, addresses of cache lines in the group that are evicted from the cache memory; and
    in response to a determination that all addresses of evicted cache lines in the group have been de-queued from the FIFO buffer, setting the threshold to be less than the value of the counter.

13. The method of claim 1, wherein selecting the one or more remaining cache lines for eviction comprises:
    determining that an eviction correlation value for the group has exceeded a first threshold.

14. The method of claim 13, further comprising:
incrementing the eviction correlation value in response to a determination that a rate of cache line eviction from the group is greater than or equal to a second threshold; and decrementing the eviction correlation value in response to a determination that a rate of cache line eviction from the group is less than or equal to a third threshold.

15. The method of claim 1, wherein selecting the one or more remaining cache lines for eviction comprises setting modified remaining cache lines in the group as being least recently used within their respective sets.

16. The method of claim 1, further comprising invalidating unmodified remaining cache lines in the group in response to determining that the criterion is satisfied.

17. An apparatus, comprising:
a cache controller, to be coupled to a cache data array, comprising:
    group identification logic to:
        assign cache lines in the cache data array to a group based on a correlation between the cache lines, the correlation based on a likelihood of accesses of the cache lines; and
    eviction logic to:
        select one or more remaining cache lines in the group for eviction from the cache data array based at least in part on evictions of cache lines in the group from the cache data array.

18. The apparatus of claim 17, wherein the correlation occurs for cache lines installed in the cache data array during a specified time interval.

19. The apparatus of claim 17, wherein the correlation occurs for cache lines associated with a common prefetch event.

20. The apparatus of claim 17, wherein the correlation occurs when the cache lines have matching bits in a portion of address bits associated with the cache lines.

21. A processor, comprising:
at least one processor core;
a cache memory; and
a cache controller configured to:
    assign cache lines in a cache memory to a group based on a correlation between the cache lines, the correlation based on a likelihood of accesses of the cache lines;
    track evictions of cache lines in the group from the cache memory; and
    select one or more remaining cache lines in the group for eviction from the cache memory based at least in part on evictions of cache lines in the group from the cache memory.

* * * * *